United States Patent Office 2,929,717
Patented Mar. 22, 1960

2,929,717

DEHYDRATING COFFEE EXTRACT

Roderick K. Eskew, Glenside, Pa., assignor to the United States of America as represented by the Secretary of Agriculture No Drawing. Application November 15, 1957
Serial No. 696,885

2 Claims. (Cl. 99—71)

(Granted under Title 35, U.S. Code (1952), sec. 266)

A non-exclusive, irrevocable, royalty-free license in the invention herein described, throughout the world, for all purposes of the United States Government, with power to grant sublicenses for such purposes, is hereby granted to the Government of the United States of America.

This invention relates to dehydrating coffee extract.

An object of this invention is to provide economical processes for the substantially complete dehydration of coffee extract producing powdered coffee wherein the product suffers negligible heat damage and may be quickly reconstituted by the addition of water to yield coffee having substantially the flavor of the fresh coffee or coffee of enhanced flavor.

In general according to the invention a high solids concentrate coffee extract is preferably passed through a preheater into a vacuum down-flow film-type evaporator, hereinafter described, in a film of the order of 1 mm. thickness wherein the feed rate, temperature and vacuum are so regulated that the product emerges as a molten liquid. The product temperature may range from about 220° to 290° F. In any case the material will be at its boiling point under the prevailing pressure. The temperature and vacuum may also be varied so as either to dehydrate with no flavor alteration or to enhance flavor through a controlled heat effect. In general the heating time in the evaporator does not exceed about one minute and the vacuum may vary between 20 inches and 29 inches of mercury. The resulting product should have a moisture content of about 1 to 4%, that is, at least about 96% solids content. The molten product is then rapidly cooled to about ordinary room temperature, to produce a hard, brittle solid that is readily crushed to a coarse powder.

In producing powdered coffee the material fed to the down-flow film-type evaporator can be an extract made by countercurrent extraction in known manner with or without additional concentration. Since coffee extract is relatively low in sugar I prefer to add a sufficient quantity of sugar to the concentrate to cause the product leaving the down-flow film-type evaporator to be in a flowable molten state at a temperature where the product is not heat damaged. The sugar or mixture of sugars can desirably be such as to keep the product molten without the use of excessive heat and not to impart significant sweetness. For example, sucrose, dextrose, corn syrup solids and invert sugar or mixtures thereof can be used.

An evaporator that has been found satisfactory for the final concentration step has a vertical tube, jacketed for heating fluid, down the inside of which flows the concentrate being dried. Rotating blades within the tube keep the concentrate in a thin film on the heated wall. An overhead outlet leads to a condenser and vacuum pump while a bottom outlet serves for removal of the product. The preheated concentrate is fed in above the heated zone at such a rate that the final product has the desired moisture content. The heating fluid is supplied at as high a temperature as can be tolerated without heat damage to the product.

It is necessary, in selecting optimum values for the several process variables to first determine the moisture content desired in the final product. For example, for most products it is necessary that this be less than about 4% in order that the product may be brittle enough to be pulverized at room temperature. Certain products should have 1% moisture; others readily permit 3% or even 4%. If the product is chilled below room temperature before being ground, somewhat higher moisture content can be tolerated.

Having determined the final moisture content to be reached the three variables, feed rate, temperature and vacuum, governing the operation of the film-type evaporator are readily adjusted to the optimum operating conditions.

Intensification in flavor of the reconstituted beverage results when the concentrate is dehydrated under certain conditions. For example, by decreasing the amount of sugar added, by reducing the rate of feed, by increasing the temperature of the molten product or by reducing the vacuum flavor enhancement can be achieved. Although the nature of the flavor enhancement of coffee is not fully understood, it may be analogous to the roasting of coffee beans.

The falling film-type vacuum evaporator with rotating blades is the only type that has been found to give a satisfactory product. Its great advantage lies in the range over which the heat effect during evaporation can be varied. It affords a means whereby the heat effect can be controlled from an insignificant amount to one sufficient to bring about a desirable flavor enhancement. A suitable evaporator is that described in U.S. Patent 2,596,086.

The following example illustrates the practice of specific embodiments of the invention.

*Example 1*

*Soluble coffee powder.*—A commercial clarified coffee extract, prepared by the countercurrent leaching of fresh-roasted, ground coffee beans with hot water following known procedures was the starting material. Its original solids content of 22% was increased to about 64% (by weight) by vacuum evaporation. The concentrated coffee extract was then mixed with invert sugar syrup of about 77% solids content in such proportion that the resulting mixture contained equal weights of soluble coffee solids and of invert sugar solids, and had a total solids content of about 70% by weight.

This mixture was then fed through a tubular preheater, which raised its temperature to 163° F., into a down-flow rotary blade vacuum evaporator operated at 21 inches of mercury vacuum in the vapor space. At a feed rate of about 43 pounds per hour the steam in the jacket was held at 20 pounds per square inch gauge to obtain a molten product at 246° F. and 2.8% moisture content.

This product was pumped out of the evaporator onto a pair of rotating chilled metal rolls which quickly cooled it to room temperature and discharged it in the form of small flakes. These flakes were brittle and were easily broken to a coarse powder before packaging.

The product dissolved readily in hot water. When added in the proper proportions it yielded a beverage coffee enhanced in flavor over the reconstituted evaporator feed.

I claim:

1. The process for dehydrating coffee extract comprising evaporating said extract to at least about 96% solids content by forming said extract into a film of the order of 1 mm. thickness, heating said film to a temperature about from 220° to 290° F. in a time not exceeding about 1 minute under vacuum between 20 inches and 29 inches of mercury, cooling the product to a temperature at which it is a brittle solid and grinding it to a powder.

2. The process of claim 1 wherein a sugar is added to the extract before drying.

References Cited in the file of this patent

UNITED STATES PATENTS

| | | |
|---|---|---|
| 2,504,735 | Schwarz et al. | Apr. 18, 1950 |
| 2,542,119 | Cole | Feb. 20, 1951 |
| 2,687,355 | Benner et al. | Aug. 24, 1954 |
| 2,816,039 | Eskew | Dec. 10, 1957 |
| 2,816,840 | Turkot et al. | Dec. 17, 1957 |
| 2,825,653 | Dorsey et al. | Mar. 4, 1958 |

OTHER REFERENCES

Chem. Engineering Progress, vol. 45, No. 6, June 1949, pp. 370–376.